UNITED STATES PATENT OFFICE.

ALBERT CHARLES BLOSSIER, OF PARIS, FRANCE.

PROCESS OF MANUFACTURING RUBBER.

SPECIFICATION forming part of Letters Patent No. 713,736, dated November 18, 1902.

Application filed February 20, 1902. Serial No. 94,903. (No specimens.)

*To all whom it may concern:*

Be it known that I, ALBERT CHARLES BLOSSIER, a citizen of the French Republic, and a resident of Paris, France, have invented certain new and useful Improvements in the Process of Manufacturing Rubber, of which the following is a specification.

This invention relates to a process for the manufacture of rubber, and has for its object to enable rubber sheets or the like to be produced in a very thin, supple, and elastic form of a light color and which shall have comparatively great strength.

It is a well-known fact that the various processes hitherto introduced for the manufacture of rubber articles are unsuitable for the production of very thin rubber sheets possessing the required qualities to render them useful. In trying to exceed a certain lowest limit for thickness the product will be devoid of elasticity and be liable to become torn at the slightest provocation. For this reason it is in many cases impossible to use rubber sheets, notwithstanding that its use may be desirable, for example, in the manufacture of waterproof garments or parts of garments, dress-preservers in the sleeves, &c. These parts are at present made of thin fabrics impregnated with rubber, which, however, is not advantageous for various reasons. Moreover, the vulcanizing processes as at present practiced do not permit of the production of vulcanized rubber sheets of nearly white color unless pigments are added to insure a definite color.

The process which forms the subject of this invention enables the aforesaid desirable results to be obtained, as it permits of the preparation of a rubber mixture capable of being laminated into exceedingly thin sheets which after vulcanization exhibit great suppleness and strength and at the same time possess the required elasticity.

Furthermore, the invention comprises a manner of vulcanizing at ordinary temperature whereby a beautiful white, slightly creamy color is imparted. When coloring substances have been added to the rubber mixture, the articles produced exhibit fine clear shades in lieu of the usual indefinite colors of rubber goods manufactured by any existing process.

The rubber manufactured by my improved process may, if desired, be vulcanized under heat in an autoclave by means of superheated steam when a dull color is not deemed a disadvantage.

The invention consists in the formation of a new mixture or composition with a rubber base, which is utilized as raw material in connection with a special vulcanizing operation and special mode of procedure for cold or hot temperature.

According to the invention pure Para rubber is washed and then heated with steam to a temperature of from 30° to 50° centigrade, broadly speaking, so as to soften the same sufficiently to enable it to be passed between malaxing-cylinders. For this purpose I use an ordinary machine with a pair of heated rollers adapted to revolve in opposite directions and at different speeds.

The following mixture is separately prepared—viz., oxid of zinc in the form of white powder, about eight hundred grams; oxid of magnesium, powdered, about four hundred grams; litharge, about sixty grams. The foregoing quantities are required for one kilogram of pure Para rubber. The said mixture is then powdered, either by hand or by means of a sieve, over the sheet or cake of Para rubber withdrawn from the malaxer and is then doubled over and again, rolled between the roller, and the same operation is repeated several times until deemed sufficient to form a homogeneous mass of the rubber and the powdered mixture, the rollers being each time adjusted closer together and their temperature progressively elevated. The sheet thus obtained is then passed between calendering-rollers, when it will be found that the rubber may be rolled into extremely thin sheets. The thickness of the sheets so prepared depends naturally on the subsequent use thereof, and in certain cases it may be advantageous to employ the said process for the production of thick sheets, and in such case the rubber presents a clear shade, as hereinbefore stated. The product is now vulcanized.

If it is desired to vulcanize at ordinary temperature, so as to avoid the production of a dark shade, use is made of sulfuret of carbon, naphtha-oil, benzol, or any other essential oil capable of dissolving rubber, to which an addition is made of protechlorid of sulfur in the proportion of two and one-half per cent. of the weight of the solvent used.

When it is deemed preferable to vulcanize in the autoclave by means of superheated steam at 130° to 140° centigrade, the composition of the rubber mixture must be altered— i. e., in lieu of sixty grams of litharge about seventy grams of sublimed sulfur-brimstone is employed. To this is then added any suitable coloring substance as ordinarily used for the purpose and in accordance with the requirements for the production of either white or colored rubber.

What I claim, and desire to secure by Letters Patent of the United States, is—

1. The process of manufacturing articles of rubber which consists in first softening the pure rubber, then thoroughly incorporating into the said rubber oxid of zinc and oxid of magnesium, in the proportion by weight of about eighty parts of oxid of zinc and forty parts of oxid of magnesium to one hundred parts of pure rubber, then preparing the mass for vulcanization forming the mass into the desired shape and then vulcanizing the same, substantially as described.

2. The process of manufacturing articles of rubber which consists in first softening the pure rubber, then kneading into the same a pulverulent mixture of oxid of zinc and oxid of magnesium in the proportions by weight of about eighty parts of oxid of zinc and forty parts of oxid of magnesium to one hundred parts of the rubber under an increasing temperature until the pulverulent mixture is thoroughly incorporated, then preparing the mass for vulcanization, then forming the mass into the shape desired and vulcanizing the same, substantially as described.

3. The process of manufacturing rubber articles which consists in first softening the pure rubber, then thoroughly incorporating with the same a pulverulent mixture of oxid of zinc and oxid of magnesium in the proportion by weight of about eighty parts of oxid of zinc and forty parts of oxid of magnesium to one hundred parts of rubber, then adding six parts of litharge, then forming the mass into the shapes desired and vulcanizing the same at ordinary temperature, substantially as described.

4. The process of manufacturing rubber articles which consists in first softening the pure rubber, then thoroughly incorporating with the same oxid of zinc and oxid of magnesium together with litharge in about the following proportions by weight; eighty parts of oxid of zinc, forty parts of oxid of magnesium, and six parts of litharge to one hundred parts of rubber, forming the mass into the shape desired and then vulcanizing at ordinary temperature in a solvent to which is added two and one-half per cent. by weight of the protochlorid of sulfur, substantially as described.

In testimony whereof I affix my signature in the presence of two witnesses.

ALBERT CHARLES BLOSSIER.

Witnesses:
   EDWARD P. MACLEAN,
   ADOLPH STURM.